US007858695B2

(12) United States Patent
Chalmers et al.

(10) Patent No.: US 7,858,695 B2
(45) Date of Patent: Dec. 28, 2010

(54) AQUEOUS POLYMER DISPERSION

(75) Inventors: Amanda Jane Chalmers, Vermont (AU); Jason Michael Farrugia, Laverton South (AU); Elizabeth Ann Salter, Ballarat North (AU); Christopher Henry Such, Mount Eliza (AU); Olga Maree MacKinnon, Blackburn South (AU)

(73) Assignee: DuluxGroup (Australia) Pty Ltd, Victoria (AU)

( * ) Notice: Subject to any disclaimer, the term of this patent is extended or adjusted under 35 U.S.C. 154(b) by 1015 days.

(21) Appl. No.: 10/565,218

(22) PCT Filed: Jul. 23, 2004

(86) PCT No.: PCT/AU2004/000989

§ 371 (c)(1),
(2), (4) Date: Dec. 6, 2006

(87) PCT Pub. No.: WO2005/010065

PCT Pub. Date: Feb. 3, 2005

(65) Prior Publication Data

US 2007/0179240 A1 Aug. 2, 2007

(30) Foreign Application Priority Data

Jul. 23, 2003 (AU) .............................. 2003903838

(51) Int. Cl.
*C08F 8/30* (2006.01)
(52) U.S. Cl. ...................... 524/555; 524/556; 524/559; 524/560; 524/561
(58) Field of Classification Search ................. 524/556, 524/559, 560, 561, 555
See application file for complete search history.

(56) References Cited

U.S. PATENT DOCUMENTS

| | | | |
|---|---|---|---|
| 3,875,099 A | 4/1975 | Kurth et al. |
| 4,289,823 A | 9/1981 | Arkens |
| 4,468,498 A | 8/1984 | Kowalski et al. |
| 4,469,825 A | 9/1984 | Kowaski et al. |
| 4,478,972 A | 10/1984 | Conrady |
| 5,157,084 A | 10/1992 | Lee et al. |
| 5,266,646 A | 11/1993 | Eisenhart et al. |
| 6,475,712 B1 | 11/2002 | Wang et al. |

FOREIGN PATENT DOCUMENTS

| | | |
|---|---|---|
| CA | 1 247 283 A | 12/1988 |
| CA | 1 276 338 A | 11/1990 |
| CA | 2 362 465 A | 7/2000 |
| EP | 0 301 880 B | 9/1993 |
| EP | 1 209 213 A | 5/2002 |
| GB | 2 170 105 A | 7/1986 |
| WO | WO-00/05276 A | 2/2000 |
| WO | WO-01/05844 A | 1/2001 |
| WO | WO-02/26895 A | 4/2002 |
| WO | WO-02/44290 A | 6/2002 |

OTHER PUBLICATIONS

Derwent Abstracts Accession No. 93-392700/49, and JP 5-295039 A (Japan Synthetic Rubber Co Ltd), Nov. 9, 1993.
Patent Abstract of Japan, Publication No. 60-192718-A, Oct. 1, 1985 (Dainippon Ink & Chem Inc).
Derwent Abstract Accession No. 87-155167/22, and RO 90605-A (Cent Protect Anticoroz (Lacu)), Nov. 29, 1986.

*Primary Examiner*—Bernard Lipman
(74) *Attorney, Agent, or Firm*—Birch, Stewart Kolasch & Birch LLP

(57) ABSTRACT

The invention provides a process for preparing an aqueous dispersion of water insoluble heteropolymeric particles comprising polymerising in an aqueous reaction medium ethylenically unsaturated monomers, said ethylenically unsaturated monomers comprising ionisable ethylenically unsaturated monomers and non-ionisable hydrophilic ethylenically unsaturated monomers, to form said heteropolymeric particles dispersed in said aqueous reaction medium, wherein the monomers in said reaction medium at any point in time comprise less than 5 weight % of ionisable ethylenically unsaturated monomer, wherein for at least a part of the polymerisation the monomers in said reaction medium have a composition which is maintained with an ionisable ethylenically unsaturated monomer content of from 0.5 to less than 5 weight % throughout polymerisation of at least 30 weight % of the total amount of monomers polymerised to form the heteropolymeric particles, and wherein the total amount of non-ionisable hydrophilic ethylenically unsaturated monomers and ionisable ethylenically unsaturated monomers polymerised constitutes at least 75 weight % of the total amount of monomers polymerised to form the heteropolymeric particles, a method of preparing a paint comprising conventional paint additives and the aqueous dispersion of water insoluble heteropolymeric particles of the invention, and a novel aqueous dispersion of water insoluble heteropolymeric particles.

50 Claims, No Drawings

AQUEOUS POLYMER DISPERSION

FIELD OF THE INVENTION

The present invention relates to polymeric coating products. In particular, the invention relates to a process for preparing an aqueous dispersion of water insoluble heteropolymeric particles suitable for use in coating products. The invention also relates to the aqueous dispersions and their use as binders or thickeners for paints, adhesives, textile coatings, carpet backings and construction materials. The aqueous dispersions are particularly useful in the preparation of paints and accordingly it will be convenient to hereinafter describe the invention with reference to this application, however it is to be understood that the aqueous dispersions can be used in other applications.

BACKGROUND OF THE INVENTION

Aqueous dispersions of polymer particles are used extensively in waterborne paint products. A common requirement within typical formulating practices for such waterborne paints is that the use of rheological additives and other modifiers is relied upon to a much greater extent than for their solvent based counterparts. Depending on the end use, it is not uncommon for waterborne paints to contain more than one additive to provide the balance of viscosities required for application, anti-settling and flow characteristics and to optimise film formation.

Common rheological control additives include thickening agents such as cellulose ethers and water-soluble gums. Thickening agents of this class often rely on flocculation to impart their thickening effect, which in turn can have detrimental effects on other properties of the paint. Accordingly, paints formulated with such thickening agents can exhibit rheology conducive to easy application, but at the same time demonstrate inferior package homogeneity, leveling, gloss, bonding ability to chalked paint surfaces and exterior durability.

Other rheological control additives commonly used are the so called alkali swellable acrylic (ASA) thickeners, which are acid containing acrylic latex copolymers. When neutralised with base such as ammonia, these materials become thick, viscous liquids. In particular, upon being neutralised the particles of acrylic copolymer that make up the thickener absorb water and swell to thereby increase the viscosity of the material. Such materials are typically employed at relatively low levels and can effectively increase the viscosity of paint formulations. However, to achieve their thickening effect the acrylic copolymer particles must be prepared using relatively high levels of acid monomer, the presence of which can render paint films water sensitive. Accordingly, it is generally impractical to incorporate ASA thickeners at high levels in paint formulations or use them as a sole thickener/binder in most applications. Furthermore, this class of thickener is prone to being sensitive to other formulation ingredients such as the addition of water miscible co-solvents associated with tinters or other additives.

Rheological control additives play an important role in enabling paints to be formulated with desirable rheological properties. However, the use of such additives, in particular thickening agents, can be problematic in that they can impart undesirable characteristics to the paint and/or the resulting paint film, and increase the complexity of formulating. Considerable research effort has therefore been directed toward developing paint formulations that provide suitable rheological properties with less reliance on rheological control additives.

One area of research has concentrated on developing means to reduce the amount of thickening agent required in paint formulations. An approach that has met with some success has been to use a specific class of aqueous dispersions of polymer particles which have an alkali responsive thickening effect similar to that of the ASA thickeners. However, unlike the ASA thickeners, these aqueous dispersions have a limited ability to thicken, and they can effectively be used as the sole binder in paint formulations. In particular, the aqueous dispersions are prepared using less acid monomer which on one hand reduces the aforementioned water sensitivity problem, and on the other hand renders the polymer particles with less ability to swell and thereby minimises the thickening effect of the dispersion.

U.S. Pat. No. 3,875,099 discloses a method for preparing an aqueous dispersion of swellable acrylic copolymer particles. The particles contain 0.5 to 2.5 weight % of an $\alpha,\beta$-unsaturated carboxylic acid, and the particular swelling characteristics of the particles are said to result from the controlled introduction of the acid during the polymerisation process. In particular, at least 70 weight % of the acid must be introduced during the process in a manner such that the acid monomer portion is 3 to 15 weight % by weight of all the monomers being concurrently added, such addition further beginning before more than 50 weight % of the non-acid monomers have been introduced and terminating before more than 90 weight % of the non-acid monomers have been introduced.

U.S. Pat. No. 4,468,498 discloses a process for making an aqueous dispersion of swellable water insoluble core/sheath polymer particles. In this case, the particular swelling characteristics of the particles are said to result from an ionic core polymer containing ionisable acid groups. In particular, the core polymer has a composition comprising a non-acid monomer copolymerised with at least 5 weight % of a carboxylic acid monomer, or 15 to 100 weight % of the acid monomer where no other hydrophilic monomer is present, based on the weight of monomers used to form the core polymer. A sheath polymer, which constitutes at least four times the mass of the core polymer and optionally contains low levels of acid monomer, encapsulates the core polymer to thereby form the particles.

As mentioned above, aqueous dispersions that are prepared using lower acid monomer levels, such as those disclosed in U.S. Pat. No. 3,875,099 and U.S. Pat. No. 4,468,498, exhibit a reduced thickening effect compared with ASA thickeners, but are more suited for use as a sole binder in paint formulations. Despite such aqueous dispersions exhibiting a reduced thickening effect, the degree of thickening that they can ultimately impart to a given paint formulation nevertheless still needs to be considered carefully. Inadequate swelling of the polymer particles can result in little if no thickening effect being imparted to the formulation, and a relatively large degree of swelling of the polymer particles can render the formulation highly viscous. While it is desirable to increase the viscosity of the formulation, to date such highly viscous formulations have had limited practical use in coating applications. In particular, highly viscous paint formulations laden with large swollen polymer binder particles typically have poor flow and leveling properties, the effect of which often results in applicator marks, such as brush lines, being retained in the cured paint film. Gloss properties of a resultant paint film are also typically greatly impaired.

Accordingly, aqueous dispersions of swellable polymer particles suitable for use as sole or primary binders in paint formulations are typically prepared such that the polymer particles can swell to impart some thickening effect, yet are also restricted from swelling to an extent that would render a formulation highly viscous. The polymer particles disclosed in U.S. Pat. No. 4,468,498 for example are prepared such that they comprise a swellable core of concentrated polymeric acid which is encapsulated by a sheath polymer. A crosslinking monomer is typically included in the core polymer to restrict its flexibility and thereby limit its ability to swell. Paints formulated using such a material as the sole binder are said to require less thickening agent than would typically be required if a conventional acrylic latex binder were used.

The aqueous dispersion of polymer particles disclosed in U.S. Pat. No. 3,875,099 is prepared such that the polymer particles comprise a reduced level of acid monomer compared with U.S. Pat. No. 4,468,498, and generally a considerable amount of hydrophobic monomer. The combined effect of the hydrophobic monomer content and the reduced level of acid monomer is believed to render these polymer particles with a limited ability to swell. Aqueous dispersions of such polymer particles are said to be capable of achieving viscosities of up to 30,000 centipoises at a solids content of about 50%. Paints formulated using these aqueous dispersions as a sole binder are also likely to require less thickening agent than would typically be required if a conventional acrylic latex binder were used.

Despite the advantage of being able to reduce the amount of thickening agent employed in paint formulations through use of state of the art aqueous dispersions of swellable polymer particles, it would be desirable to provide an aqueous dispersion of polymer particles that could be used to prepare versatile paint formulations which required little if no thickening agent. It would also be desirable if such aqueous dispersions could render products, such as paints, with a relatively high viscosity, yet still enable the product to demonstrate good levelling, flow and gloss properties.

SUMMARY OF THE INVENTION

The present invention provides a process for preparing an aqueous dispersion of water insoluble heteropolymeric particles comprising polymerising in an aqueous reaction medium ethylenically unsaturated monomers, said ethylenically unsaturated monomers comprising ionisable ethylenically unsaturated monomers and non-ionisable hydrophilic ethylenically unsaturated monomers, to form said heteropolymeric particles dispersed in said aqueous reaction medium, wherein the monomers in said reaction medium at any point in time comprise less than 5 weight % of ionisable ethylenically unsaturated monomer, wherein for at least a part of the polymerisation the monomers in said reaction medium have a composition which is maintained with an ionisable ethylenically unsaturated monomer content of from 0.5 to less than 5 weight % throughout polymerisation of at least 30 weight % of the total amount of monomers polymerised to form the heteropolymeric particles, and wherein the total amount of non-ionisable hydrophilic ethylenically unsaturated monomers and ionisable ethylenically unsaturated monomers polymerised constitutes at least 75 weight % of the total amount of monomers polymerised to form the heteropolymeric particles.

Surprisingly, it has now been found that an aqueous dispersion of polymer particles comprising relatively low levels of ionisable monomer throughout at least 30 wt % of the particles, and a combined total of at least 75 weight % of hydrophilic and ionisable monomers, can be prepared such that the swelling characteristics of the polymer particles can provide aqueous dispersions having high viscosity and good levelling and flow properties. Paints formulated using these aqueous dispersions advantageously require little or no additional rheological control additives, are versatile and can attain high viscosity while still demonstrating good levelling, flow and gloss properties.

DESCRIPTION OF THE PREFERRED EMBODIMENTS

As used herein, the term "heteropolymeric" particles denotes particles that are formed from a polymer which is derived from the polymerisation of at least two different monomers. For example, the term "heteropolymeric" particles would include copolymeric and terpolymeric particles.

As used herein, the term "ionisable" ethylenically unsaturated monomers denotes ethylenically unsaturated monomers that have functional groups which can be ionised to form cationic or anionic groups. Such functional groups will generally be capable of being ionised under acidic or basic conditions through loss or acceptance of a proton. Generally, the ionisable functional groups are acid groups or basic groups. For example, a carboxylic acid functional group may form a carboxylate anion under basic conditions, and an amine functional group may form a quaternary ammonium cation under acidic conditions. The functional groups may also be capable of being ionised through an ion exchange process.

The ionisable ethylenically unsaturated monomers are polymerised in accordance with the process of the invention to form the heteropolymeric particles. By this process, ionisable functional groups are incorporated within the polymeric matrix of the heteropolymeric particles. The ionisable groups are believed to in general facilitate swelling/deswelling of the heteropolymeric particles in a manner similar to that which occurs in conventional swellable polymeric particles. Accordingly, the heteropolymeric particles, comprising for example ionisable acid functional groups, upon being neutralised or with a volatile base such as ammonia (ie. ionisation of the acid functional groups), would become more hydrophilic and swell through absorption of water. Conversely, deswelling of the particles is facilitated by the ionised acid functional groups reverting back to their non-ionised form through, for example, evaporation of the base. In this case, as the particles return to their less hydrophilic state, water is expelled from the particles and they begin to deswell.

Examples of suitable ionisable ethylenically unsaturated monomers which have acid groups include, but are not limited to, methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid. Examples of suitable ionisable ethylenically unsaturated monomers which have basic groups include, but are not limited to, 2-(dimethyl amino) ethyl and propyl acrylates and methacrylates, and the corresponding 3-(diethylamino) ethyl and propyl acrylates and methacrylates. The required basic groups could also be formed in situ by post reaction of functional monomers such as glycidyl methacrylate with a suitable amine co-reactant, typically a secondary amine. Alternatively, post-reaction of functional monomers with an amino acid can be used to generate an ionisable acid group. It will be appreciated by those skilled in the art that numerous other suitable two stage reaction sequences could be used to provide the required basic or acid groups.

As used herein the term "non-ionisable" hydrophilic ethylenically unsaturated monomers denotes ethylenically unsaturated monomers that do not have ionisable functional groups. In particular, such monomers do not have acid groups or basic groups which can loose or accept a proton under acidic or basic conditions. Apart from being non-ionisable, these monomers are also hydrophilic. By "hydrophilic" is meant a monomer which has a solubility in water of at least 5 g/L at 50° C.

Examples of suitable non-ionisable hydrophilic ethylenically unsaturated monomers include, but are not limited to, methyl methacrylate, ethyl acrylate, vinyl acetate, methyl acrylate, propyl acrylate, isopropyl methacrylate, hydroxy ethyl methacrylate, hydroxy propyl methacrylate. A particularly preferred non-ionisable hydrophilic ethylenically unsaturated monomer for use in the present invention is ethyl acrylate.

Aqueous dispersions prepared in accordance with the process of the present invention are capable of attaining viscosities of greater than 100,000 centipoises at a 50% solids content. Surprisingly, dispersions with such high viscosities have been found to exhibit good flow and levelling properties. The dispersions also have a low ionisable monomer content and can advantageously be used as a sole binder in paint formulations without the need for additional thickening agents. Paints formulated with the dispersions exhibit good flow and levelling properties, and most notably can exhibit high gloss properties.

Without wishing to be bound by theory, it is believed that the advantageous rheological properties of the dispersion are derived primarily from unique swelling and deswelling characteristics of the heteropolymeric particles. In particular, it is believed that such heteropolymeric particles have the ability to readily swell and deswell at a rate faster than conventional swellable polymer particles.

The unique swelling/deswelling characteristics of the heteropolymeric particles are in turn reflected in the ability of the aqueous dispersions to readily undergo an increase or decrease in viscosity at a rate faster than conventional aqueous dispersions of swellable polymer particles. Accordingly, an aqueous dispersion of heteropolymeric particles prepared in accordance with the present invention, comprising for example ionisable acid functional groups, upon being neutralised with a base such as ammonia, can become thick and viscous relatively quickly. Conversely, such a thick and viscous dispersion, upon loss of the base through evaporation, can undergo a relatively fast decrease in its viscosity to enable the dispersion to flow more readily.

The responsive rheological properties of the dispersions prepared in accordance with the present invention provide for two important practical advantages. The first of these relates to the aforementioned ease and rate at which the dispersions attain an increase in viscosity. In particular, the dispersions, upon ionisation of the ionisable function groups, can reach a maximum viscosity quickly without having to be heated. Accordingly, both time and energy required to promote a viscosity increase in the dispersions are reduced.

The second advantage relates to the aforementioned ease and rate at which the dispersions can achieve a decrease in viscosity. In particular, as a result of such properties the dispersion may be prepared so as to develop higher viscosities than would generally be considered practical. The highly viscous nature of these dispersion can therefore be used advantageously, while good flow and levelling properties of the dispersion can still be attained through a subsequent reduction in its viscosity. Importantly, the reduction in viscosity occurs before the dispersion begins to cure and develop a skin.

The aforementioned advantages are equally applicable, and possibly more relevant, to paint formulations comprising the dispersions. Paint formulations having high viscosities are particularly advantageous in that they can be more easily transferred by a brush or roller and are less susceptible to dripping during transfer. However, to date such highly viscous formulations have been impractical due to their inherent poor flow and levelling properties. Paint formulations comprising dispersions prepared in accordance with the present invention can, however, be highly viscous, yet still provide good flow and levelling properties. In particular, a paint formulation comprising the dispersion as a sole binder, and for example comprising ionisable acid functional groups, can be rendered thick and viscous without the need for additional thickening agents upon being neutralised with a volatile base such as ammonia. When the paint is applied to a substrate, evaporation of the base facilitates a reduction in the paints viscosity before it has time to form a skin. The reduction in viscosity is sufficient to enable the paint to flow and level to thereby form a film substantially free of brush marks and the like.

In accordance with the process of the invention, the ethylenically unsaturated monomers are polymerised in an aqueous reaction medium to form the aqueous dispersion of water insoluble heteropolymeric particles. The polymerisation may be performed using emulsion, suspension or dispersion polymerisation. Preferably the polymerisation is an emulsion polymerisation. Preferably the polymerisation is a free radical polymerisation.

The aqueous dispersions are particularly suited to being prepared using emulsion polymerisation, and accordingly it will be convenient to hereinafter describe the invention with reference to this polymerisation technique. However, it is to be understood that the aqueous dispersions can be prepared using other polymerisation techniques.

An emulsion polymerisation system will typically comprise water, monomer, surfactant and initiator. The emulsion polymerisation process generally commences by dispersing monomer (organic phase) in the water (aqueous phase), with the aid of the surfactant, to provide an emulsion. The initiator, which is usually soluble in the continuous aqueous phase, provides a source of the free radicals that initiate polymerisation. The dispersed organic phase provides monomer to propagating polymer chains which in turn form small polymer particles. During formation, and in a final form, the polymer particles are stabilised from coalescence by the surfactant. The polymerisation process therefore provides as a product an aqueous dispersion of polymer particles.

The presence of ionisable functional groups within the polymeric matrix of the heteropolymeric particles is believed to facilitate swelling/deswelling of the particles. However, the mere presence of the groups alone is not believed to provide the particles with their unique swelling/deswelling characteristics. Without wishing to be bound by theory, other factors such as the amount and distribution of the ionisable functional groups within the heteropolymeric particles, and the amount of non-ionisable hydrophilic monomer used to prepare the particles, are also believed to play an important role in providing the particles with their unique properties.

Given that dispersions prepared in accordance with the process of the invention have specific compositional requirements, the manner in which the monomers are introduced during the process is an important feature of the process. In particular, the monomers should be introduced such that there is less than 5 weight %, preferably no more than 4 weight %, more preferably no more than 3 weight % of the ionisable monomers present in the aqueous reaction medium at any point in time. By being "present in the aqueous reaction medium", the monomers are considered to be available for polymerisation and to act as the source of monomers which are polymerised to form the heteropolymeric particles. Accordingly, by there being less than 5 weight % of ionisable monomer present in the reaction medium at any given point in time, the resulting heteropolymeric particles can only comprise less than 5 weight % of polymerised ionisable monomer.

The ionisable monomer may be introduced at any point during the process, in one portion or progressively and/or in stages, provided that for at least a part of the polymerisation the monomers in the aqueous reaction medium have a composition which is maintained with an ionisable monomer content of from 0.5 to less than 5 weight %, preferably from 1 to less than 5 weight %, more preferably from 2 to less than 5 weight %, throughout polymerisation of at least 30 weight %, preferably at least 55 weight %, more preferably at least 75 weight %, of the total amount of monomers polymerised to form the heteropolymeric particles. By this process requirement, the heteropolymeric particles are prepared such that they have at least a 30 weight % portion or segment which comprises at any given point from 0.5 to less than 5 weight % of polymerised ionisable monomer.

The part of the polymerisation process which provides for the at least 30 wt % portion or segment which comprises from 0.5 to less than 5 weight % of polymerised ionisable monomer is preferably a final part of the polymerisation process.

During the part of the polymerisation process where the monomer composition in the reaction medium is maintained with an ionisable monomer content of from 0.5 to less than 5 weight %, the specific overall monomer composition does not necessarily need to be maintained. This process requirement will be satisfied provided the ionisable monomer content is maintained within the defined range. Accordingly, during this part of the polymerisation the ionisable monomer content in the reaction medium may vary from 0.5 to less than 5 weight %, and the composition of other monomers present in the reaction medium can also vary.

Preferably, the amount of ionisable monomer introduced during the process provides for heteropolymeric particles comprising from about 0.5 to less than 5 weight %, more preferably from about 1 and about 4 weight %, most preferably from about 2.5 and about 3 weight % of polymerised ionisable monomer.

The non-ionisable hydrophilic monomers may be introduced at any point during the process, in one portion or progressively and/or in stages, provided that the combined amount of non-ionisable hydrophilic and ionisable monomers introduced, and subsequently polymerised, constitutes at least 75 weight %, preferably at least 80 weight %, more preferably at least 85 weight % of the total amount of monomers polymerised to form the heteropolymeric particles. Given that the heteropolymeric particles formed can only comprise less than 5 weight % of polymerised ionisable monomer residues, by this process requirement the particles must comprise more than 70 weight % of polymerised non-ionisable hydrophilic monomer.

In addition to the non-ionisable hydrophilic and ionisable monomers, hydrophobic monomers having a solubility in water of less than 5 g/L at 50° C. may also be introduced during the process to thereby contribute to the formation of the heteropolymeric particles. Preferably, the total amount of hydrophobic monomers polymerised constitutes no more than 20 weight %, more preferably no more than 10 weight %, most preferably no more than 5 weight % of the total amount of monomers polymerised to form the heteropolymeric particles. Examples of suitable hydrophobic monomers include, but are not limited to, styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, vinyl butyrate, vinyl tert-butyrate, vinyl stearate and vinyl laurate.

It is preferable to introduce at least some hydrophobic monomer during the polymerisation process. The inclusion of hydrophobic monomer has been found to be useful in improving the balance of thickening and the flow of paint compositions derived from the dispersions following application of the paint.

The monomers introduced may further include monomers with more than one reactive polymerisable group as crosslinking agents. Examples of suitable polyfunctional monomers include, but are not limited to, glycerol propoxy triacrylate, glycerol propoxy trimethacrylate, ethylene glycol dimethacrylate, trimethylolpropane triacrylate and trimethylolpropane trimethacrylate. The crosslinking agent may be added in an amount of 0 to 2%, more preferably 0.001 to 1% by weight of the total amount of monomers polymerised to form the heteropolymeric particles.

Alternative methods of providing controlled crosslinking may be through the introduction of polymerisable monomers that contain a functional group which can react with a complementary coreacting functional monomer such as an acid monomer, hydroxy monomer, or combinations of these monomers. Such monomers include, but are not limited to, 2-isocyanoethyl methacrylate, N-methyl acrylamide, and glycidyl methacrylate or acrylate. Those skilled in the art will appreciate the diverse range of crosslinking reactions and reagents that can be used.

In considering the amount, type and stage at which monomers are introduced and subsequently polymerised in accordance with the process of the invention, it is important to appreciate that the resulting heteropolymeric particles need to be capable of absorbing water and ionising or neutralising agents (eg. ammonia). Accordingly, at least a portion of the surface of the particles or outer composition of the particles should be permeable to water and ionising or neutralising agents. The presence of some ionisable and/or non-ionisable hydrophilic polymerised monomer residues in these outer regions of the particles has been found to assist in the penetration of water and ionising or neutralising agents into the inner composition of the particles.

The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiator ideally should also have the requisite solubility in the reaction medium.

Thermal initiators are chosen to have an appropriate half life at the temperature of polymerisation. These initiators can include, but are not limited to, one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramidine), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation. These initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Preferred initiating systems are those which are appreciably water soluble. Suitable water soluble initiators include, but are not limited to, ammonium peroxydisulfate, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine) dihydrochloride, 2,2'-azobis(2-amidinopropane) dihydrochloride, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide) dihydrate.

Preferably, the aqueous reaction medium will contain the initiator. In addition, the aqueous reaction medium may also contain other additives, for example additives to regulate pH.

When the process of the invention is performed using emulsion polymerisation techniques, a surfactant or stabilising agent is generally required. The type of stabilising agent will depend on a number of factors such as the monomer composition used and the temperature at which the polymerisation is conducted. Preferred stabilising agents include anionic surfactants, such as sodium dodecyl sulfate, nonyl phenol ethoxylate sulfate, alkyl ethoxylate sulfates, alkyl sulfonates, alkyl succinates, alkyl phosphates, alkyl carboxylates, and other alternatives well known to those skilled in the art. Other stabilising agents include polymeric stabilisers, cationic surfactants or non-ionic surfactants.

The ability to control the size and composition of polymer particles during an emulsion polymerisation is generally an important issue. In particular, both the size and the composition of the particles can influence the properties of the resulting emulsion. Techniques for establishing such control are generally well known in the art. For example, the type and amount of surfactant and the distribution of the surfactant in the polymerisation are known to be influencing factors.

One approach to controlling particle size and composition is known as a 'seed stage' technique. In this technique a small amount of the monomer to be polymerised is added to the reactor in the presence of some surfactant and the polymerisation is initiated to form an initial crop of 'seed' particles. These particles are then grown by the further addition of monomer and initiator, the process of which is generally supported by the addition of further surfactant. In particular, the seed particles are preferably grown in a manner so as to avoid the tendency to form additional particles during the course of the polymerisation that are derived from a monomer composition which is different from that used to form the original seed particles. By attempting to grow the particles in such a uniform way, the resulting dispersions will also generally exhibit uniform properties.

The process of forming these additional particles is often called secondary or new nucleation, and there occurrence may be detected by a second particle population measured using standard particle sizing techniques such as Capillary Hydrodynamic Fractionation (CHDF).

For dispersions prepared in accordance with the invention, it has been found that maximum thickening efficiency can be attained when substantially all particles, or at the least the majority of particles, have substantially the same composition and size. In the process of the invention, particles are generally being formed in a sequential polymerisation process where monomers are not only being fed at different stages but the composition of the monomer feed is often deliberately different. Accordingly, in order to obtain maximum thickening efficiency, the uniform growth of the polymer particles will be an important process parameter to consider.

Without wishing to be bound by theory, the thickening mechanism associated with the dispersions of the invention is believed to operate through an excluded volume effect. In other words, upon neutralisation of the ionisable groups within the particles, water may be absorbed into the particles from the continuous aqueous phase. By this process, the particles undergo an increase in volume and therefore occupy a greater proportion of the entire volume of the dispersion. The net effect of this being that the amount of 'free' water in the aqueous phase is reduced and the viscosity of the dispersion correspondingly increases.

The thickening efficiency of the dispersions of the invention is believed to relate to the uniformity in size of the polymer particles. It is also believed that the actual size of the particle influences the thickening efficiency of the dispersions. In particular, it is believed that a maximum thickening efficiency can be obtained from dispersions having a large number of small particles rather than a fewer number of larger particles. However, this thickening efficiency must also be balanced against other rheology attributes required by the dispersion for specific applications. For example, it may be that by maximising the thickening efficiency of a given dispersion, products prepared from that dispersion may exhibit a higher thickening effect than is practical for its intended application. Accordingly, the particle size of the polymer in dispersions prepared in accordance with the present invention should be tailored to suit the rheological requirements intended application for which the dispersion is to be used. In practice, an average particle size of the polymer particles is preferably below about 200 nm (as measured by CHDF).

The monomers may be utilised in monomeric form, or in the form of prepolymers. For example, the ionisable monomers may be introduced in a prepolymerised form, either in the form of a pre-homopolymer or as a pre-copolymer with one or more of the non-ionisable hydrophilic monomers.

The aqueous dispersion of the present invention may be prepared via a single polymerisation step or the polymerisation may be conducted sequentially. By conducting a sequential polymerisation the particles can be conveniently prepared with regions or sections having different compositions. Where sequential polymerisation is used, it is often convenient to refer to the resulting heteropolymeric particles as having a core/sheath type structure. As used herein, the term "core" refers to the internal region the heteropolymeric particles, and the term "sheath" refers to the outer regions. While the core/sheath terminology may imply that the particles are composed of two separate structural components, of possibly different composition, it is to be understood that the particles may not have this exact structure and that the distinction between the core and the sheath may not be as precise as suggested by this terminology.

The core component of the particles will generally be prepared in a single stage or step of a sequential polymerisation, as would the sheath component. However, the core component may also be prepared using a plurality of steps in sequence, followed by the preparation of the sheath component using a series of sequential steps as well.

The aqueous dispersion of the present invention is preferably prepared using sequential polymerisation. In this case, it is also preferable that the resulting heteropolymeric particles comprise sections or regions having different polymeric compositions. For example, the core section may comprise one polymeric composition and the sheath section another. The formation of heteropolymeric particles having a structure comprising at least two different polymeric compositions has been found to be a particularly effective way of tailoring the rheological properties of the dispersions.

In a preferred embodiment of the invention, monomers are introduced in a first feed to provide for a core section of the heteropolymeric particles, followed by a subsequent introduction of monomers in a second feed to provide for a sheath section. By "first" and "second" feeds is meant an introduction of monomers that collectively provide for the core and sheath sections, respectively. The feeds themselves may be conducted such that monomers are introduced concurrently, sequentially and/or in stages.

Ionisable monomers may be included in both the first and second feeds. However, as the amount of ionisable monomer in the first feed is reduced, the resulting aqueous dispersions have been found to provide paint films that exhibit increased water resistance. Reducing the ionisable monomer content in the first feed has also been found to lower the net viscosity increase that can be attained by the dispersion upon neutralisation. Accordingly, the amount of ionisable monomer included in the first feed can be selected depending upon the desired properties and intended use of the resulting aqueous dispersion. Where the dispersions are to be used in paint formulations, it is generally preferred that the first feed comprises little if no ionisable monomer. Preferably, the first feed includes less than 20 weight % of the total ionisable monomer. Preferably, the first feed comprises monomers which constitute at least 10 weight %, more preferably at least 30 weight %, most preferably from 30 to 50 weight % of the total amount of monomers that are polymerised to form the heteropolymeric particles. Under these preferred conditions, the part of the polymerisation which provides for the at least 30 wt % portion or segment of the particles comprising from 0.5 to less than 5 weight % of polymerised ionisable monomer will typically be a final part, if not the final part, of the polymerisation process.

Hydrophobic monomer may be included in both the first and second feeds. Preferably, the hydrophobic monomer is only included in the second feed. The inclusion of polymerised hydrophobic monomer in the heteropolymeric particles increases the hydrophobic character of the particles and therefore reduces their swelling capacity. The amount and distribution of polymerised hydrophobic monomer residues in the particles therefore needs to be balanced against the desired rheological properties of the resulting aqueous dispersion.

As with the ionisable functional groups, the polymerised non-ionisable hydrophilic monomer within the heteropolymeric particles is also believed to play an important role in influencing the swelling/deswelling characteristics of the particles. However, unlike the ionisable functional groups, the polymerised non-ionisable hydrophilic monomers constitute a significant proportion of the heteropolymeric particles. The portion of the polymer derived from these monomers is believed to be particularly important in imparting sufficient hydrophilic character to the particles to enable at least some water and ionising or neutralising agent to enter and penetrate into the particles to promote ionisation. Preferably, polymerised non-ionisable hydrophilic monomer units are distributed throughout the entire particle composition and are therefore included in both first and second feeds.

Where a polyfunctional ethylenically unsaturated monomer is used to provide crosslinking to the polymeric matrix of the heteropolymeric particles, the polyfuctional monomers are preferably included in the second feed.

In addition to variations in the type and distribution of polymerised monomers within the heteropolymeric particles, variation in the molecular weight of the polymerised monomers has also been found to influence the rheological properties of the aqueous dispersions. This effect has been found to be complex and without wishing to be bound by theory, is believed to arise due to the way in which the internal forces within the particle are balanced and respond to the small change in pH which naturally occurs in the early stages of film drying. In particular, a small change in pH is believed to produce a large change in the ability of water to remain within the interior of the particle. Such a pH change is also believed to cause shrinkage of the particle and a reduction in the viscosity of the drying film and therefore enhanced flow. Notably, this behaviour appears to be favoured by the presence of a proportion of low molecular weight material formed during the first feed of the process.

Preferably the number average molecular weight of polymer formed during the first feed of the polymerisation process is less than about 60,000, more preferably less than about 50,000, most preferably less than about 40,000. In a particularly preferred embodiment the number average molecular weight of polymer formed during the first feed is less than about 30,000.

By having an appreciation of difference between the number average molecular weight of polymeric compositions formed from polymerisation of monomers in the first and second feeds, it has been found that the flow of the dispersion and appearance of the final film coating can be optimised for a given application.

Means for polymerising monomers to provide for polymeric compositions of different molecular weight are well known in the art. One way in which this can be achieved is by simply performing the polymerisation in the presence of different amounts of initiator. For example, a higher amount of initiator can be introduced to promote polymerisation of monomers of the first feed compared with that introduced to promote polymerisation of monomers of the second feed. By this regime, the polymeric composition derived from monomers of the second feed will have a higher molecular weight than the polymeric composition derived from monomers of the first feed. Accordingly, the initiator is preferably introduced such that the number average molecular weight of the polymeric composition formed from polymerisation of monomers of the first feed is lower than that of the polymeric composition formed from polymerisation of monomers of the second feed.

Variation in the molecular weight of the polymerised monomers can also be achieved through use of a polyfunctional ethylenically unsaturated monomer to provide crosslinking to the polymeric matrix of the heteropolymeric particles. To promote a higher number average molecular weight of the polymeric composition formed from polymerisation of monomers of second feed, the polyfunctional monomer is preferably included in the monomer composition of the second feed. Sufficient polyfunctional monomer is added to promote the desired increase in molecular weight.

Preferably, the polyfunctional monomer is added in amounts ranging from about 0.1 to about 2 weight %, more preferably ranging from about 0.25 to about 1 weight %, of the total amount of monomers in the second feed.

The aqueous dispersions of the present invention have the ability to thicken upon being ionised with a neutralising or ionising agent (hereinafter referred to as an ionising agent). Thickening can be achieved by adding a suitable ionising agent to the dispersion following polymerisation, or it can be achieved by adding the dispersion to an aqueous composition comprising a suitable ionising agent. Examples of agents which may be used to ionise acid ionisable groups include alkali metal bases, such as NaOH, KOH, $Na_2CO_3$ and $NaHCO_3$, ammonium hydroxide, alkaline earth metal bases such as $Ca(OH)_2$, or lower aliphatic amines, such as trimethylamine and triethylamine. Examples of agents which may be used to ionise basic ionisable groups include mineral acids, such as HCl, $H_2SO_4$, $HNO_3$ and $H_3PO_4$ and organic acids, such as acetic acid, lactic acid, formic acid, citric acid and oxalic acid. In addition, subsequent flow and levelling properties of paints derived from these aqueous dispersions can be influenced by the volatility of the chosen ionising agent. Where flow is a preferred property, it has been found that this property may be optimised through the use of a volatile ionising agent. Combinations of volatile and non-volatile agents can be utilised to impart specific balances of properties, for example flow out and sagging resistance.

By the term "volatile" ionising agent it is meant that the agent is capable of evaporating from the dispersion to promote flow and levelling of the dispersion.

Aqueous dispersions prepared in accordance with the invention have responsive rheological properties. Such properties are particularly advantageous where products comprising the dispersions are to be packaged for sale in a thickened state. In particular, products such as paints can be conveniently thickened at the point of packaging through addition of an appropriate ionising agent. Such agents can be added to the paint as part of the normal addition of paint ingredients. The addition of the ionising agent(s) may be done as a single addition at the final stage of the paint formulation process. Alternatively, a portion of the ionising agent may be added during an early stage of the formulation process to accelerate the timing of the finished paint composition attaining its final viscosity.

The aqueous dispersions of the invention are particularly suited for use in film forming products such as paints. As will be appreciated by those skilled in the art, the ability of an aqueous dispersion of polymer particles to form a film is closely related to the glass transition temperature (Tg) of the polymer particles. The Tg of the particles is in turn related to the type and amount of monomers that are polymerised to form the particles.

Polymers contained in conventional coating products that are designed to form a film under ambient conditions will generally have a Tg that does not exceeding 40° C. Polymers having Tg's greater than 40° C. are generally considered to be too hard to enable adequate film formation. For coating products containing polymers that have Tg's approaching 40° C., film formation will generally be assisted by addition of coalescing aids or solvents of low water miscibility which aid film formation by plasticising the polymer particles. The Tg of a given polymer will generally be formulated by balancing the level of hard monomer, such as methyl methacrylate, against the soft monomer, such as ethyl or butyl acrylate. For coatings containing polymers that have lower Tg's, film formation can generally proceed without the assistance of a coalescent.

For dispersions in accordance with the invention, the capacity of the polymer particles to absorb water and swell has been found to advantageously assist in the film forming capacity of the dispersion. In particular, after neutralisation water is believed to reside within the inner volume of the particle and increase the mobility of the polymer chains relative to each another, an effect which is believed to be an important requirement during film formation. Through this inherent property of the particles, the dispersions can surprisingly be prepared using polymers having Tg's approaching and exceeding 40° C. while still maintaining an ability to form a film without the assistance of a coalescent.

Under some conditions, use of a conventional coalescing solvent may be preferred to accelerate the initial neutralisation step. An important feature of the neutralisation step is that the ionising agent is able to diffuse freely and preferably rapidly into the heteropolymer particles. A coalescing solvent has been found to be particular suitable for accelerating this process. Under these conditions, the coalescent acts simply as an accelerant and can therefore be used at a much lower level than would traditionally be used if it were to function as a coalescent.

An alternative way in which the neutralisation step may be accelerated is through the use of heat. Heating the dispersion to a temperature above the formulated Tg of the polymer can also increase the mobility of polymer chains and allow the ionising agent to diffuse into the interior of the particle.

The process of the invention conveniently enables the Tg of the heteropolymeric particles to be tailored through varying the Tg of the polymer composition formed by polymerisation of monomers of the first feed relative to the Tg of the polymer composition formed by polymerisation of monomers of the second feed. The first feed composition can advantageously be formulated to provide polymers which have a broad range of Tg's. In particular, the first feed composition can be formulated to provide polymers which have Tg's well above that generally utilised in conventional film forming dispersions. Compositions where the first feed formulation provides polymers which have a Tg of about 70° C. show surprising swelling and thickening behaviour and have a beneficial impact on film properties such as blocking resistance (ie. the tendency of two film surfaces to adhere together after coming into close contact). Where the first feed composition is formulated to provide such a high Tg, it may be necessary to formulate the second feed to provide polymers which have a Tg that is preferably below ambient temperature. The use of such a second feed formulation has been found to assist in accelerating the neutralisation step.

In some applications, such as in an adhesive, it may be desirable to use a dispersion that contains a polymer with a low Tg. Aqueous dispersions prepared in accordance with the invention comprising polymer particles that have a low Tg will generally swell readily on neutralisation and it may be that the extent of swelling will need to be restricted. In this case, swelling may be restricted by simply formulating the dispersions with less ionisable monomer, or by crosslinking the polymer composition through use of a crosslinking agent.

The Tg of the polymer composition formed from polymerisation of monomers of the first feed preferably ranges from about −50° C. to about 100° C., more preferably from about 10° C. to about 70° C., most preferably from about 10° C. to about 50° C. The Tg of the polymer composition formed from polymerisation of monomers of the second feed preferably ranges from about −50° C. to about 100° C., more preferably from about −10° C. to about 70° C., most preferably from about 0° C. to about 40° C.

Tg values referred to herein are calculated (ie theoretical). Tg values relating to a copolymer have been calculated in accordance with the Fox equation ($1/Tg=Wn/Tg(n)$).

Conventional thickening agents used in coating products are typically water soluble or water dispersible polymers and are sometimes hydrophobically modified. The chemical nature of the thickener is often very different to that of the film forming material and can therefore introduce problems of compatibility. The inclusion conventional thickening agents in paint compositions can also introduce water sensitive residues within the film, the effect of which can often generate a tacky film surface.

In gloss paint formulations, conventional thickening agents are often responsible for compromising the gloss obtained from the final film. In this case, thickener residues become involved in a range of complicated associations within the structure of the film often involving the pigment particles themselves. These associations are undesirable and can result in premature flocculation of the pigment and reduced gloss. As well as a reduction in the measured gloss, premature flocculation of the pigment can result in the early cessation of flow after application of the paint, and effect which can greatly reduce smoothness of the formed film and result in the presence of unsightly brush marks.

Aqueous dispersions prepared in accordance with invention can be used as a sole or primary binders in paint formulations without the need for additional thickening agents. The lack of conventional thickening agents in paint formulated with these dispersions has advantageously been found to improve the gloss properties of films derived from the paint.

As used herein, the term "primary" binder is intended to denote an aqueous dispersion of polymer particles which is used as a binder in a paint formulation in an amount of more than 50 wt. % relative to the total mass of binder used in the paint formulation. Preferably, the aqueous dispersion is used as a binder in the paint formulation in an amount of at least 60 wt. %, more preferably in an amount of at least 75 wt. %, most preferably in an amount of at least 90 wt. %. In a particularly preferred embodiment of the invention, the aqueous dispersion is used as the sole binder in the paint formulation.

The aqueous dispersions of the invention may be used as a thickener or binder in a paint. In such an application the dispersions are added to or combined with conventional paint additives or components to provide a paint base or composition of the required characteristics. Examples of suitable paint additives, in addition to the binder, include thickeners, anti-fungal agents, UV absorbers, extenders, pigments etc. Some of these additives may be precombined with the aqueous dispersions before incorporation into the paint composition. The aqueous dispersions may also be used as binders or thickeners for adhesives, textile coatings, carpet backings and construction materials. In these applications the dispersions may be combined with additives and components known in the art.

Accordingly, in another aspect of the invention there is provided a method of preparing a paint comprising combining conventional paint additives with the aqueous dispersion of water insoluble heteropolymeric particles prepared in accordance with the process of the present invention. The aqueous dispersion may be thickened through use of a ionising agent either before or after it is combined with the paint additives. Preferably, the aqueous dispersion is thickened after it is combined with the paint additives to thereby increase the viscosity of the paint.

The unique rheological properties of aqueous dispersions prepared in accordance with the invention are believed to be derived from the amount and distribution of polymerised ionisable monomer residues, and the amount of polymerised non-ionisable hydrophilic monomers present in the heteropolymeric particles.

Accordingly, in a further aspect of the invention there is provided an aqueous dispersion of water insoluble heteropolymeric particles, said heteropolymeric particles comprising polymerised ionisable ethylenically unsaturated monomers and polymerised non-ionisable hydrophilic ethylenically unsaturated monomers, wherein the polymerised ionisable ethylenically unsaturated monomers are present in an amount of less than 5 weight % throughout the polymeric composition of the heteroploymeric particles, wherein a segment which represents at least 30 weight % of the heteropolymeric particles has a polymeric composition which comprises no less than about 0.5 weight % and less than 5 weight % of polymerised ionisable ethylenically unsaturated monomers, based on the total weight of monomers polymerised to form the segment, and wherein the combined amount of polymerised ionisable ethylenically unsaturated monomers and non-ionisable hydrophilic ethylenically unsaturated monomers constitute at least 75 weight % of the heteropolymeric particles.

In order to facilitate an understanding of the invention reference will be made to the accompanying examples which illustrate some preferred aspects of the invention. However it is to be understood that the particularity of the following description is not to supersede the generality of the invention hereinbefore described.

EXAMPLES

Example 1

Dispersion formulated with a 30:70 weight ratio of first and second feeds and where the first feed has a Tg of 50° C. and the second 15° C. A crosslinking monomer has been included in the second feed.

An aqueous dispersion of copolymeric particles was made via the following method:

(i) First Monomer Feed

A first monomer emulsion was made by adding to a vessel, 135.3 g of ethyl acrylate and 266.8 g of methyl methacrylate. To the monomer mixture was added 6.4 g of 60% solution of Alkanate WH60 (Huntsman Chemicals) in ethanol/water and 138.7 g of de-ionised water, and an emulsion formed under shear.

ii) Second Monomer Feed

A second monomer emulsion was made by mixing, 451.5 g of ethyl acrylate, 298.0 g of methyl methacrylate, 6.0 g glyceryl propoxy triacrylate (Sartomer SR 2090), 33.5 g acrylic acid, 42.2 g PLEX 6844-0 (Rohm Monomers) 67.0 g butyl acrylate, and 40.2 g acetoacetoxyethyl methacrylate. To the monomer mixture was added 14.9 g of 60% solution of Alkanate WH60 (Huntsman Chemicals) in ethanol/water and 316.7 g of de-ionised water. An emulsion formed under shear.

(iii) First Initiator Feed

A solution of initiator was made by mixing 62.7 g of de-ionised water, 2.6 g of ammonium persulphate, and 0.46 g of sodium carbonate.

(iv) Second Initiator Feed

A solution of initiator was made by mixing 73.2 g of de-ionised water, 3.1 g of ammonium persulphate, and 0.54 g of sodium carbonate.

(v) Precursor Stage

A solution of 902.1 g of de-ionised water and 8.36 g of 60% solution of Alkanate WH60 were added to a round bottom reaction vessel at 90° C. with stirring.

(vi) Monomer Seed 16.6 weight % of the emulsified first feed was added to the reaction vessel.

(vii) Initiator Spike

A mixture of 12.9 g of de-ionised water, 0.38 g of ammonium persulphate, and 0.54 g of sodium carbonate was added to the reaction vessel.

(viii) Polymerisation

The monomer seed was fed into the reaction vessel over a period of 5 minutes. This was immediately proceeded by the addition of the initiator spike. Once temperature was stabilised after exotherm, the first monomer feed and first initiator feed was pumped into the reaction vessel under stirring over a period of 144 minutes. This is then followed by the second monomer feed and second initiator feed over 168 minutes.

(ix) Dilution and Termination

After 312 minutes, 51.6 g of de-ionised water was added. After a 15 minutes hold 3.6 g tert-butyl perbenzoate was added. Following a further 10 minute hold a solution of 1.7 g sodium erythorbate in 51.6 g of de-ionised water was feed into the reaction vessel over a 45 minute period.

(x) Post-Addition

After a further 10 minutes the latex was cooled. Once the latex temperature was below 60° C. 0.32 g of the defoamer Bevaloid 4226 (Rhodia) was added. After the temperature was below 40° C., 7.93 g of the biocide Acticide MV (Thor Chemicals) was added.

The final latex was filtered through 90 μm silk collected and found to have the characteristics shown in Table 1.

TABLE 1

Characteristics of latex formed from Example 1

| Solids (% nv*) | Viscosity Brookfield 20 rpm | Dn (nm) CHDF | Dw (nm) CHDF |
|---|---|---|---|
| 45.17% | 62.0 | 101.7 | 105.4 |

*nv = non-volatiles

All viscosity measurements were performed on a Brookfield model DV-II+ viscometer at 25° C.

Example 2

A modification of Example 1, excluding the use of crosslinking monomer.

The procedure of Example 1 was repeated, except the monomer composition of the second feed altered to exclude the crosslinking monomer glyceryl propoxy triacrylate (Sartomer SR 2090). The resulting monomer composition of the second feed contained 452.4 g ethyl acrylate, 303.1 g of methyl methacrylate, 33.5 g acrylic acid, 42.2 g PLEX 6844-0 (Rohm Monomers) 67.0 g butyl acrylate and 40.2 g acetoacetoxyethyl methacrylate.

TABLE 2

Description of products formed in Examples 1 and 2.

| Example | Description | Solids (% nv*) |
|---|---|---|
| 1 | GPTA Feed 2 | 45.17 |
| 2 | No GPTA | 44.71 |

*nv = non-volatiles

Example 3

Modification of Example 1 to include the crosslinking monomer uniformly throughout both feed compositions.

a) An aqueous dispersion of copolymeric particles was made via the following method:

(i) First Monomer Feed

A first monomer emulsion was made by adding to a vessel, 135.1 g of ethyl acrylate and 265.3 g of methyl methacrylate. To the monomer mixture was added 6.4 g of 60% solution of Alkanate WH60 (Huntsman Chemicals) in ethanol/water and 138.7 g of de-ionised water, and an emulsion formed under shear. 16.6% of the emulsified first feed set aside as the monomer seed. To the remainder of the first monomer feed, 1.8 g glyceryl propoxy triacrylate (Sartomer SR 2090) was added and shear reapplied.

(ii) Second Monomer Feed

A second monomer emulsion was made by mixing, 451.7 g of ethyl acrylate, 299.5 g of methyl methacrylate, 4.2 g glyceryl propoxy triacrylate (Sartomer SR 2090), 33.5 g acrylic acid, 42.2 g PLEX 6844-0 (Rohm Monomers) 67.0 g butyl acrylate, and 40.2 g acetoacetoxyethyl methacrylate. To the monomer mixture was added 14.9 g of 60% solution of Alkanate WH60 (Huntsman Chemicals) in ethanol/water and 316.7 g of de-ionised water. An emulsion formed under shear.

(iii) First Initiator Feed

A solution of initiator was made by mixing 62.7 g of de-ionised water, 2.6 g of ammonium persulphate, and 0.46 g of sodium carbonate.

(iv) Second Initiator Feed

A solution of initiator was made by mixing 73.2 g of de-ionised water, 3.1 g of ammonium persulphate, and 0.54 g of sodium carbonate.

(v) Precursor Stage

A solution of 902.1 g of de-ionised water and 8.36 g of 60% solution of Alkanate WH60 were added to a round bottom reaction vessel at 90° C. with stirring.

(vi) Monomer Seed

The emulsified monomer seed was added to the reaction vessel.

(vii) Initiator Spike

A mixture of 12.9 g of de-ionised water, 0.38 g of ammonium persulphate, and 0.54 g of sodium carbonate was added to the reaction vessel.

(viii) Polymerisation

The monomer seed was fed into the reaction vessel over a period of 5 minutes. This was immediately proceeded by the addition of the initiator spike. Once the temperature was stabilised after exotherm, the first monomer feed and first initiator feed was pumped into the reaction vessel under stirring over a period of 144 minutes. This was then followed by the second monomer feed and second initiator feed over 168 minutes.

ix) Dilution and Termination

After 312 minutes, 51.6 g of de-ionised water was added. After a 15 minutes hold 3.6 g tert-butyl perbenzoate was added. Following a further 10 minute hold a solution of 1.7 g sodium erythorbate in 51.6 g of de-ionised water was feed into the reaction vessel over a 45 minute period.

(x) Post-Addition

After a further 10 minutes the latex was cooled. Once the latex temperature was below 60° C. 0.32 g of the defoamer Bevaloid 4226 (Rhodia) was added. After the temperature was below 40° C., 7.93 g of the biocide Acticide MV (Thor Chemicals) was added.

The latex was then filtered through 90 μm silk and collected for characterisation and testing.

Example 4

The procedure of Example 3 was modified so as to add the crosslinking monomer exclusively to the first feed composition.

The procedure of Example was 3 repeated, except the monomer composition of the first and second feeds was altered to include all of the crosslinker glyceryl propoxy triacrylate in the first monomer feed only. The resulting monomer composition of the first feed included 134.5 g of ethyl acrylate, 261.7 g of methyl methacrylate and 6.03 g glyceryl propoxy triacrylate (Sartomer SR 2090). The second monomer feed contained 452.4 g ethyl acrylate, 303.1 g of methyl methacrylate, 33.5 g acrylic acid, 42.2 g PLEX 6844-0 (Rohm Monomers), 67.0 g butyl acrylate and 40.2 g acetoacetoxyethyl methacrylate.

Example 5

Comparative paint examples showing the impact of latex formulating parameters from Examples 1-4 on paint characteristics. Comparison was made to a conventional generic gloss latex paint.

Generic Gloss Latex Paint: R&H GLOSS FORMULA ON PRIMAL BM425M Ref: Rohm & Haas Formulation Advice GTC-124-31

The following was added in order to high speed mixer whilst stirring.

|  | Parts by Weight (g) |
|---|---|
| WATER-GRADE 2 | 1.72 |
| PROPYLENE GLYCOL | 3.43 |
| OROTAN 1124 | 0.42 |
| PROXEL GXL | 0.09 |
| TRITON CF-10(90%) | 0.34 |
| AMMONIUM HYDROXIDE-25% | 0.09 |
| FOAMASTER III | 0.09 |

The following was added to high speed stirrer whilst stirring. The mixture was stirred at high speed for 20 minutes.

| TIONA RCL 575 | 26.09 |
|---|---|
| Wash down was performed. | |
| WATER-GRADE 2 | 0.26 |
| Wash out was performed. | |
| WATER-GRADE 2 | 0.60 |

The following were added in order to mixer. The mixture was stirred for 10 minutes.

| WATER-GRADE 2 | 12.69 |
|---|---|
| PRIMAL BM425M | 50.04 |
| TRITON CF-10(90%) | 0.27 |
| TEXANOL | 2.05 |
| FOAMASTER III | 0.09 |

The following were added in order to mixer. The mixture was stirred for 30 minutes.

| ACRYSOL RM-2020NPR | 1.29 |
|---|---|
| ACRYSOL RM-8W | 0.45 |

Physical Properties

| Weight | 100.000 |
|---|---|
| Volume | 76.775 |
| Weight Solids | 52.42 |
| Volume Solids | 38.58 |
| WPL | 1.303 |
| WPL Solids | 1.770 |
| PVC | 21.48 |

Experimental Paint Formulations:

Each of the experimental latices produced as examples 1-4 were formulated into thickener free paints. Coalescing solvent was used to achieve the required viscosity development. The paint samples are designated as samples 5/1-5/4 inclusive, with the control generic formulation designated 5/gen.

Formulation

The following were added in order to mixer, followed by stirring for 5 minutes.

|  | Parts by Weight (g) |
| --- | --- |
| WATER-GRADE 2 0.1% | 3.67 |
| PROPYLENE GLYCOL | 0.77 |
| FOAMASTER III | 0.10 |
| AMMONIUM HYDROXIDE-25% | 0.25 |
| OROTAN 731A | 0.52 |
| TERIC 460 | 0.35 |

The following was added to high speed mixer whilst stirring.

| TIONA RCL 575 | 19.50 |
| --- | --- |

The sides and shaft were washed down and the mixer run at high speed for 20 minutes.

| WATER-GRADE 2 0.1% | 0.30 |
| --- | --- |

The following water stage was added while running at high speed. The mixer was run at high speed for 5 minutes.

| WATER-GRADE 2 0.1% | 1.01 |
| --- | --- |
| Washout was performed. | |
| WATER-GRADE 2 0.1% | 3.55 |

The following were added in order to mixer whilst stirring. The pH was adjusted to pH 8.5 with 25% Ammonium Hydroxide. An adjustment for water was made at end of make-up.

| WATER-GRADE 2 | 8.90 |
| --- | --- |
| EXPERIMENTAL LATEX (45.3% NV) | 56.00 |
| AMMONIUM HYDROXIDE-25% | 0.50 |
| TERIC 460 | 0.50 |
| BEVALOID 4226 | 0.02 |
| PROXEL GXL | 0.08 |

The following was added slowly with stirring and the mixture stirred for 10 minutes.

| PROPYLENE GLYCOL | 2.99 |
| --- | --- |

The following were added separately and slowly with stirring and the mixture was stirred for 10 minutes.

| COASOL | 0.50 |
| --- | --- |
| BEVALOID 4226 | 0.50 |
| The pH was adjusted to pH 9–9.5 | |
| AMMONIUM HYDROXIDE-25% | 0.00 |

Physical Properties

| Weight | 100.000 |
| --- | --- |
| Volume | 81.376 |
| Weight Solids | 46.19 |
| Volume Solids | 33.94 |
| WPL | 1.229 |
| WPL Solids | 1.672 |
| PVC | 17.22 |

Results

Brookfield Viscosity (cP) data for samples prepared in Example 5 are shown in Table 3. The viscosities of the paint samples were monitored after storage at 25° C.

TABLE 3

Brookfield Viscosity (cP, 2 rpm) data for samples prepared in Example 5.

| Time | Sample | | | | |
| --- | --- | --- | --- | --- | --- |
| (days) | 5/gen | 5/1 | 5/2 | 5/3 | 5/4 |
| 0 | 19800 | 21650 | 32000 | 29200 | 35400 |
| 3 | NT* | 140200 | 244500 | 206500 | 274000 |
| 7 | NT | 173500 | 274200 | 232500 | 307000 |
| 13 | NT | 180000 | 311500 | 211000 | 253000 |
| 24 | NT | 173000 | 225500 | 218500 | 277000 |
| 32 | NT | 181000 | 239000 | 182500 | 252500 |
| 68 | NT | 165000 | 198500 | 185000 | 226500 |

*NT = Not tested but conventional gloss latex paints typically have a stable viscosity after storage under ambient conditions.

Despite the absence of any conventional external thickener of any type, all of the experimental paints developed high viscosities. The best viscosity stability was obtained from a situation where the crosslinking monomer was included as part of the second feed composition ie sample 5/1.

Gloss and Flow

The viscosities of the experimental paints would ordinarily be considered impractically high, preventing good levelling and film appearance.

The most critical test for appearance is the assessment of a film applied by brush application to a non-porous panel and allowed to dry in a vertical orientation. The measurement of instrumental gloss is another method of assessment. Both of these methods were used to compare the experimental paints to the film of generic gloss latex paint. Gloss measurements were performed using a Dr Lange Glossmeter. Gloss data is shown below in Table 4.

TABLE 4

Gloss data for samples prepared in Example 5.

| Brushed | Sample | | | | |
| --- | --- | --- | --- | --- | --- |
| Gloss | 5/gen | 5/1 | 5/2 | 5/3 | 5/4 |
| 20° | 26.2 | 62.0 | 58.0 | 55.7 | 58.9 |
| 60° | 77.5 | 81.0 | 78.2 | 77.9 | 78.8 |

The very low instrumental gloss measurement for the generic gloss latex paint was confirmed by the poor film appearance obtained. Brush marks were very evident in the film.

Visual Assessment

All films were assessed visually for the extent to which brushmarks were visible in the final film by brushing out a consistent mass (generally about 2.8 g) of paint in 1 coat onto a Leneta Form 8B display panel. The paints were allowed to dry at 25° C. for 24 hours and then given a numerical rating based on their appearance. Results for example 5 are summarised in Table 5 below.

TABLE 5

Brush mark assessment for samples prepared in Example 5.

| | Sample | | | | |
|---|---|---|---|---|---|
| | 5/gen | 5/1 | 5/2 | 5/3 | 5/4 |
| Rating | 0 | 5 | 5 | 5 | 5 |

5 = Excellent flow (almost complete levelling of brush marks)
0 = Poor flow (brush marks clearly visible)

Example 6

Latices formulated to include crosslinking monomers of different type.

Example 6(a)

An aqueous dispersion of copolymer particles was made via the following method:

(i) First Monomer Feed

A first monomer emulsion was made by adding to a vessel, 135.3 g of ethyl acrylate and 266.8 g of methyl methacrylate. To the monomer mixture was added 6.4 g of 60% solution of Alkanate WH60 (Huntsman. Chemicals) in ethanol/water and 138.7 g of de-ionised water, and an emulsion formed under shear.

(ii) Second Monomer Feed

A second monomer emulsion was made by mixing, 433.1 g of ethyl acrylate, 291.3 g of methyl methacrylate, 4.2 g ethylene glycol dimethacrylate (Rhom Monomers), 33.5 g acrylic acid, 42.2 g PLEX 6844-0 (Rohm Monomers) 67.0 g butyl acrylate, and 67.0 g acetoacetoxyethyl methacrylate. To the monomer mixture was added 14.9 g of 60% solution of Alkanate WH60 (Huntsman Chemicals) in ethanol/water and 316.1 g of de-ionised water. An emulsion formed under shear.

(iii) First Initiator Feed

A solution of initiator was made by mixing 62.7 g of de-ionised water, 2.6 g of ammonium persulphate, and 0.46 g of sodium carbonate.

(iv) Second Initiator Feed

A solution of initiator was made by mixing 73.2 g of de-ionised water, 3.1 g of ammonium persulphate, and 0.54 g of sodium carbonate.

(v) Precursor Stage

A solution of 902.1 g of de-ionised water and 8.36 g of 60% solution of Alkanate WH60 were added to a round bottom reaction vessel at 90° C. with stirring.

(vi) Monomer Seed 16.6 weight % of the emulsified first feed was added to the reaction vessel.

(vii) Initiator Spike

A mixture of 12.9 g of de-ionised water, 0.38 g of ammonium persulphate, and 0.54 g of sodium carbonate was added to the reaction vessel.

(viii) Polymerisation

The monomer seed was fed into the reaction vessel over a period of 5 minutes. This was immediately proceeded by the addition of the initiator spike. Once temperature was stabilised after exotherm, the first monomer feed and first initiator feed was pumped into the reaction vessel under stirring over a period of 60 minutes. This was then followed by the second monomer feed and second initiator feed over 120 minutes.

(ix) Dilution and Termination

After 180 minutes, 51.6 g of de-ionised water was added. After a 15 minutes hold 3.6 g tert-butyl perbenzoate was added. Following a further 10 minute hold a solution of 1.7 g sodium erythorbate in 51.6 g of de-ionised water was feed into the reaction vessel over a 45 minute period.

(x) Post-Addition

After a further 10 minutes the latex was cooled. Once the latex temperature was below 60° C. 0.32 g of the defoamer Bevaloid 4226 (Rhodia) was added. After the temperature was below 40° C., 7.93 g of the biocide Acticide MV (Thor Chemicals) was added.

The final latex was filtered through 90 μm silk and collected.

The procedure of example 6(a) was repeated, except that the second feed composition was altered to replace the crosslinking monomer ethylene glycol dimethacrylate with other crosslinking monomers with different polarity and functionality. The crosslinking monomers were included on an equivalent of double bonds basis so as to keep the theoretical crosslink density unaltered.

Example 6(b)

the resulting monomer composition of the second feed contained 430.94 g ethyl acrylate, 291.60 g methyl methacrylate, 6.06 g triethylene glycol dimethacrylate, 33.50 g acrylic acid, 42.22 g PLEX 6844-0 (Rolun Monomers), 67.00 g butyl acrylate, 67.00 g acetoacetoxyethyl methacrylate.

Example 6(c)

the resulting monomer composition of the second feed contained 431.38 g ethyl acrylate, 291.75 g methyl methacrylate, 5.47 g triethylene glycol diacrylate, 33.50 g acrylic acid, 42.22 g PLEX 6844-0 (Rohm Monomers), 67.00 g butyl acrylate, 67.00 g acetoacetoxyethyl methacrylate.

Example 6(d)

the resulting monomer composition of the second feed contained 431.45 g ethyl acrylate, 291.77 methyl methacrylate, 1.60 g hexanediol dimethacrylate, 33.50 g acrylic acid, 42.22 g PLEX 6844-0 (Rohm Monomers), 67.00 g butyl acrylate, 67.00 g acetoacetoxyethyl methacrylate.

Example 6(e)

the resulting monomer composition of the second feed contained 430.94 g ethyl acrylate, 291.61 g methyl methacrylate, 6.05 ethoxylated (3 moles) trimethylol propane triacrylate, PLEX 6844-0 (Rohm Monomers), 67.00 g butyl acrylate, 67.00 g acetoacetoxyethyl methacrylate.

Example 6(f)

the resulting monomer composition of the second feed contained 429.52 g ethyl acrylate, 291.16 g methyl methacrylate, 7.92 ethoxylated (6 moles) trimethylol propane triacrylate, PLEX 6844-0 (Rohm Monomers), 67.00 g butyl acrylate, 67.00 g acetoacetoxyethyl methacrylate.

Paint Evaluation

Each of the experimental latices produced as samples 6(a)-(f) were then compared using an experimental paint formulation adjusted so as to produce a final paint viscosity more typical of conventional waterborne gloss paints.

Formulation:

The following were added in order to mixer, and the mixture stirred for 5 minutes.

|  | Parts by Weight (g) |
|---|---|
| WATER-GRADE 2 0.1% | 3.00 |
| PROPYLENE GLYCOL | 1.00 |
| FOAMASTER III | 0.15 |
| AMMONIUM HYDROXIDE-25% | 0.25 |
| OROTAN 731A | 0.50 |
| TERIC 164 | 0.64 |

The following were added in order to high speed mixer whilst stirring.

| TIONA RCL 575 | 19.50 |
|---|---|

The sides and shaft were washed down and the mixer run at high speed for 20 minutes.

| WATER-GRADE 2 0.1% | 0.30 |
|---|---|

The letdown stage was added whilst running at high speed, with high speed mixing for 5 minutes.

| WATER-GRADE 2 0.1% | 0.73 |
|---|---|
| Washout was performed. | |
| WATER-GRADE 2 0.1% | 1.03 |
| The pH was adjust to pH 8.5 | |
| WATER-GRADE 2 | 13.24 |
| EXPERIMENTAL LATEX | 51.85 |
| (45.3% weight solids) | |
| AMMONIUM HYDROXIDE-25% | 0.60 |
| TERIC 164 | 0.30 |
| PROXEL GXL | 0.08 |
| BEVALOID 4226 | 0.02 |

The following was added slowly with stirring and the mixture stirred for 10 minutes.

| PROPYLENE GLYCOL | 5.00 |
|---|---|

The following were added separately, slowly and with stirring, and the mixture stirred for 10 minutes.

| COASOL | 0.95 |
|---|---|
| BEVALOID 4226 | 0.70 |

The pH was adjusted with the following. The mixture was left stirring for 1 hour whilst covered.

| AMMONIUM HYDROXIDE-25% | 0.16 |
|---|---|
| WATER-GRADE 2 0.1% | 0.00 |

Physical Properties

| Weight | 100.000 |
|---|---|
| Volume | 81.741 |
| Weight Solids | 44.94 |
| Volume Solids | 32.76 |
| WPL | 1.223 |
| WPL Solids | 1.678 |
| PVC | 17.76 |

Viscosity Development:

Brookfield Viscosity (cP) data for samples prepared in Example 6 is shown in Table 6.

TABLE 6

| Brookfield Viscosity (cP, 2 rpm) data for samples prepared in Example 6. | | | | | | |
|---|---|---|---|---|---|---|
| Days | 6(a) | 6(b) | 6(c) | 6(d) | 6(e) | 6(f) |
| 0 | 10380 | 12250 | 19550 | 18300 | 14250 | 12200 |
| 1 | 19100 | 20200 | 30300 | 34450 | 20850 | 16600 |
| 10 | 20150 | 20700 | 30250 | 38600 | 22350 | 17600 |

Despite considerable variation of crosslinking monomer structure, all latices produced thickener free paints with good workable viscosities. The films from the paints all gave excellent flow and film appearance compared to a film derived from commercially available gloss latex paints.

Example 7

Latices formulated with varying average molecular weight distributions.

Example 7(a)

An aqueous dispersion of copolymeric particles was made via the following method:

xi) First Monomer Feed

A first monomer emulsion was made by adding to a vessel, 135.3 g of ethyl acrylate and 266.8 g of methyl methacrylate. To the monomer mixture was added 6.4 g of 60% solution of Alkanate WH60 (Huntsman Chemicals) in ethanol/water and 138.7 g of de-ionised water, and an emulsion formed under shear.

(xii) Second Monomer Feed

A second monomer emulsion was made by mixing, 433.1 g of ethyl acrylate, 291.3 g of methyl methacrylate, 4.2 g ethylene glycol dimethacrylate (Rohm Monomers), 33.5 g acrylic acid, 42.2 g PLEX 6844-0 (Rohm Monomers) 67.0 g butyl acrylate, and 67.0 g acetoacetoxyethyl methacrylate. To the monomer mixture was added 14.9 g of 60% solution of Alkanate WH60 (Huntsman Chemicals) in ethanol/water and 316.1 g of de-ionised water. An emulsion formed under shear.

(xiii) First Initiator Feed

A solution of initiator was made by mixing 62.7 g of de-ionised water, 2.6 g of ammonium persulphate, and 0.46 g of sodium carbonate.

(xiv) Second Initiator Feed

A solution of initiator was made by mixing 73.2 g of de-ionised water, 3.1 g of ammonium persulphate, and 0.54 g of sodium carbonate.

(xv) Precursor Stage

A solution of 902.1 g of de-ionised water and 8.36 g of 60% solution of Alkanate WH60 were added to a round bottom reaction vessel at 90° C. with stirring.

(xvi) Monomer seed 16.6 weight % of the emulsified first feed was added to the reaction vessel.

(xvii) Initiator Spike

A mixture of 12.9 g of de-ionised water, 0.38 g of ammonium persulphate, and 0.54 g of sodium carbonate was added to the reaction vessel.

(xviii) Polymerisation

The monomer seed was fed into the reaction vessel over a period of 5 minutes. This was immediately proceeded by the addition of the initiator spike. Once temperature was stabilised after exotherm, the first monomer feed and first initiator feed was pumped into the reaction vessel under stirring over a period of 60 minutes. This was then followed by the second monomer feed and second initiator feed over 120 minutes.

(xix) Dilution and Termination

After 180 minutes, 51.6 g of de-ionised water was added. After a 15 minutes hold 3.6 g tert-butyl perbenzoate was added. Following a further 10 minute hold a solution of 1.7 g sodium erythorbate in 51.6 g of de-ionised water was feed into the reaction vessel over a 45 minute period.

(xx) Post-Addition

After a further 10 minutes the latex was cooled. Once the latex temperature was below 60° C. 0.32 g of the defoamer Bevaloid 4226 (Rhodia) was added. After the temperature was below 40° C., 7.93 g of the biocide Acticide MV (Thor Chemicals) was added.

The final latex was filtered through 90 μm silk and collected.

The procedure of example 7/a was repeated, except that the second feed composition was altered to replace the crosslinking monomer ethylene glycol dimethacrylate with other crosslinking monomers with different polarity and functionality. The crosslinking monomers were included on an equivalent of double bonds basis so as to keep the theoretical crosslink density unaltered.

Example 7(b)

The procedure of Example 7(a) was repeated, for a control comparison. It is possible that different batches of raw materials could have been sourced to prepare this dispersion as compared to Example 7(a).

Example 7(c)

The procedure of Example 7(a) was repeated, except that a reduced reaction temperature (75° C.) was employed. It may be expected that by doing this, the rate of initiator decomposition would decline and fewer radicals be produced at any given time. Hence an increase in average molecular weight.

Molecular Weight analysis via Gel Permeation Chromatography was undertaken on each of the samples 7(a) to 7(c). Molecular weights were measured relative to polystyrene standards. These results are detailed in Table 7:

TABLE 7

GPC data on samples prepared in Example 7.

| Sample taken: | Sample | | |
|---|---|---|---|
| | 7 (a) | 7 (b) | 7 (c) |
| End Monomer Feed 1 | Gel 0.3%<br>Mn 27212<br>Mw 358211<br>Poly disp 13.163 | Gel 0.4%<br>Mn 40850<br>Mw 299947<br>Poly disp 7.343 | Gel 0.3%<br>Mn 78355<br>Mw 405905<br>Poly disp 5.180 |
| Final Latex | Gel 12.1%<br>Mn 21207<br>Mw 215536<br>Poly disp 10.163 | Gel 18.4%<br>Mn 36031<br>Mw 192482<br>Poly disp 5.342 | Gel 14.4%<br>Mn 57206<br>Mw 276451<br>Poly disp 4.833 |

The gel content of samples 7(a)-7(c) listed in Table 7 were measured by the following procedure:

1. A 1% solution of the dispersion was prepared in THF and stirred for 18 hours.
2. The solution/suspension was centrifuged at high speed (25,000 rpm, 1 hour) to separate out the more dense gel (insoluble polymer) from the solution of soluble polymer. The supernatant was removed and replaced with fresh THF and the centrifugation process was repeated.
3. The supernatant was again discarded and the metal centrifuge tube with the gel plug present was dried in the oven (150 degrees, 1 hour) and weighed.

Paint Evaluation

Each of the experimental latices produced as examples 7(a)-7(c) were formulated into thickener free paints. Coalescing solvent was used to achieve the required viscosity development. The paint samples are designated as samples 7/1-7/3 inclusive.

Formulation

The following were added in order to mixer, followed by stirring for 5 minutes.

| | Parts by Weight (g) |
|---|---|
| WATER - GRADE 2 | 2.37 |
| PROPYLENE GLYCOL | 1.00 |
| FOAMASTER III | 0.15 |
| AMMONIUM HYDROXIDE-25% | 0.25 |
| OROTAN 731A | 0.50 |
| TERIC 460 | 0.55 |

The following was added to high speed mixer whilst stirring.

| | |
|---|---|
| TIONA RCL 575 | 19.50 |

The sides and shaft were washed down and the mixer run at high speed for 20 minutes.

| | |
|---|---|
| WATER - GRADE 2 | 0.30 |

The following water stage was added while running at high speed. The mixer was run at high speed for 5 minutes.

| | |
|---|---|
| WATER - GRADE 2 | 1.01 |
| Washout was performed. | |
| WATER - GRADE 2 | 1.638 |

The following were added in order to mixer whilst stirring. The pH as adjusted to pH 8.5 with 25% Ammonium Hydroxide. An adjustment for water was made at end of make-up.

| | |
|---|---|
| WATER-GRADE 2 | 13.486 |
| EXPERIMENTAL LATEX (45.3% NV) | 51.20 |
| AMMONIUM HYDROXIDE-25% | 0.66 |
| TERIC 460 | 0.50 |
| BEVALOID 4226 | 0.02 |
| PROXEL GXL | 0.08 |

The following was added slowly with stirring and the mixture stirred for 10 minutes.

| | |
|---|---|
| PROPYLENE GLYCOL | 5.00 |

The following were added separately and slowly with stirring and the mixture was stirred for 10 minutes.

| | |
|---|---|
| COASOL | 0.935 |
| BEVALOID 4226 | 0.70 |
| The pH was adjusted to pH 9–9.5 | |
| AMMONIUM HYDROXIDE-25% | 0.16 |

Physical Properties

| | |
|---|---|
| Weight | 100.000 |
| Volume | 81.660 |
| Weight Solids | 44.39 |
| Volume Solids | 32.01 |
| WPL | 1.225 |
| WPL Solids | 1.698 |
| PVC | 18.20 |

Results

Brookfield Viscosity (cP) data for samples prepared in Example 7 are shown in Table 8. The viscosities of the paint samples were monitored after storage at 25° C.

TABLE 8

Brookfield Viscosity (cP, 2 rpm) data for samples prepared in Example 7.

| Time (days) | 7/1 | 7/2 | 7/3 |
|---|---|---|---|
| 1 | 43600 | 49700 | 21000 |
| 8 | 69200 | 70700 | 37450 |

Despite the absence of any conventional external thickener of any type, all of the experimental paints developed high viscosities. The best viscosity builds were obtained from a situation where the reaction temperature of the latex included had been held at 90° C. during the polymerisation stage.

Gloss and Flow

The most critical test for appearance is the assessment of a film applied by brush application to a non-porous panel and allowed to dry in a vertical orientation. The measurement of instrumental gloss is another method of assessment. Both of these methods were used to compare the experimental paints. Gloss data is shown below in Table 9.

TABLE 9

Gloss data for samples prepared in Example 7.

| Brushed Gloss | 7/1 | 7/2 | 7/3 |
|---|---|---|---|
| 20° | 48.1 | 50.1 | 40.9 |
| 60° | 79.1 | 77.4 | 73.7 |

The very low instrumental gloss measurement for the generic gloss latex paint was confirmed by the poor film appearance obtained. Brush marks were very evident in the film.

Visual Assessment

All films were assessed visually for the extent to which brushmarks were visible in the final film. The films were given the following numerical rating, and results are summarised in Table 10 below.

TABLE 10

Brush mark assessment for samples prepared in Example 7.

| | 7/1 | 7/2 | 7/3 |
|---|---|---|---|
| Rating | 5 | 5 | 2 |

5 = Excellent flow (almost complete levelling of brush marks)
0 = Poor flow (brush marks clearly visible)

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia.

Those skilled in the art will appreciate that the invention described herein is susceptible to variations and modifications other than those specifically described. It is to be understood that the invention includes all such variations and modifications which fall within the spirit and scope. The invention also includes all of the steps, features, compositions and compounds referred to or indicated in this specification, individually or collectively, and any and all combinations of any two or more of said steps or features.

The invention claimed is:

1. A process for preparing an aqueous dispersion of water insoluble heteropolymeric particles comprising polymerising in an aqueous reaction medium ethylenically unsaturated monomers, said ethylenically unsaturated monomers being introduced in two or more sequential feeds and comprising ionisable ethylenically unsaturated monomers and non-ionisable hydrophilic ethylenically unsaturated monomers, to form said heteropolymeric particles dispersed in said aqueous reaction medium, wherein the monomers in said reaction medium at any point in time comprise less than 5 weight % of ionisable ethylenically unsaturated monomer, wherein for at least a part of the polymerisation the monomers in said reaction medium have a composition which is maintained with an ionisable ethylenically unsaturated monomer content of from 0.5 to less than 5 weight % throughout polymerisation of at least 30 weight % of the total amount of monomers polymerised to form the heteropolymeric particles, wherein the first feed comprises (a) less than 20 weight % of the total amount of ionisable ethylenically unsaturated monomers polymerised, and (b) monomers which constitute at least 30 weight % of the total amount of monomers that are polymerised to form the heteropolymeric particles, and wherein the total amount of non-ionisable hydrophilic ethylenically unsaturated monomers and ionisable ethylenically unsaturated monomers polymerised constitutes at least 75 weight % of the total amount of monomers polymerised to form the heteropolymeric particles.

2. The process according to claim 1, wherein the ionisable ethylenically unsaturated monomers comprise an ionisable acid group.

3. The process according to claim 2, wherein the ionisable ethylenically unsaturated monomers are selected from methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid.

4. The process according to claim 1, wherein the ionisable ethylenically unsaturated monomers comprise an ionisable basic group.

5. The process according to claim 4, wherein the ionisable ethylenically unsaturated monomers are selected from 2-(dimethyl amino) ethyl and propyl acrylates and methacrylates, and the corresponding 3-(diethylamino) ethyl and propyl acrylates and methacrylates.

6. The process according to claim 1, wherein the non-ionisable hydrophilic ethylenically unsaturated monomers are selected from methyl methacrylate, ethyl acrylate, vinyl acetate, methyl acrylate, propyl acrylate, isopropyl methacrylate, hydroxy ethyl methacrylate, hydroxy propyl methacrylate.

7. The process according to claim 1, wherein said at least a part of the polymerisation is a final part of the polymerisation.

8. The process according to claim 1, wherein at any point in time during polymerisation the reaction medium comprises no more than 4 wt % of the ionisable ethylenically unsaturated monomers.

9. The process according to claim 8, wherein at any point in time during polymerisation the reaction medium comprises no more than 3 wt % of the ionisable ethylenically unsaturated monomers.

10. The process according to claim 1, wherein the composition of the reaction medium is maintained with an ionisable ethylenically unsaturated monomer content of from 1 to less than 5 wt % throughout polymerisation of said at least 30 wt % of the total amount of monomers polymerised to form the heteropolymeric particles.

11. The process according to claim 10, wherein the composition of the reaction medium is maintained with an ionisable ethylenically unsaturated monomer content of from 2 to less than 5 wt % throughout polymerisation of said at least 30 wt % of the total amount of monomers polymerised to form the heteropolymeric particles.

12. The process according to claim 1, wherein for said at least part of the polymerisation the reaction medium has a composition which is maintained with said ionisable ethylenically unsaturated monomer content throughout polymerisation of at least 55 wt % of the total amount of monomers polymerised to form the heteropolymeric particles.

13. The process according to claim 12, wherein the reaction medium has a composition which is maintained with said ionisable ethylenically unsaturated monomer content throughout polymerisation of at least 75 wt % of the total amount of monomers polymerised to form the heteropolymeric particles.

14. The process according to claim 1, wherein the total amount of non-ionisable hydrophilic ethylenically unsaturated monomers and ionisable ethylenically unsaturated monomers polymerised constitute at least 80 wt % of the total amount of monomers polymerised to form the heteropolymeric particles.

15. The process according to claim 14, wherein the total amount of non-ionisable hydrophilic ethylenically unsaturated monomers and ionisable ethylenically unsaturated monomers polymerised constitute at least 85 wt % of the total amount of monomers polymerised to form the heteropolymeric particles.

16. The process according to claim 1, wherein the ethylenically unsaturated monomers which are polymerised to form the heteropolymeric particles further comprise hydrophobic ethylenically unsaturated monomers.

17. The process according to claim 16, wherein the total amount of hydrophobic monomers polymerised constitute no more than 20 wt % of the total amount of monomers polymerised to form the heteropolymeric particles.

18. The process according to claim 17, wherein the total amount of hydrophobic monomers polymerised constitute no more than 10 wt % of the total amount of monomers polymerised to form the heteropolymeric particles.

19. The process according to claim 18, wherein the total amount of hydrophobic monomers polymerised constitute no more than 5 wt % of the total amount of monomers polymerised to form the heteropolymeric particles.

20. The process according to claim 16, wherein the hydrophobic ethylenically unsaturated monomers are selected from styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, vinyl butyrate, vinyl tert-butyrate, vinyl stearate and vinyl laurate.

21. The process according to claim 1, wherein the ethylenically unsaturated monomers further comprise polyfunctional monomers that are capable of introducing crosslinks to the polymeric structure of the heteropolymeric particles.

22. The process according to claim 21, wherein the polyfunctional monomers are selected from glycerol propoxy triacrylate, glycerol propoxy trimethacrylate, ethylene glycol dimethacrylate, trimethylolpropane triacrylate, trimethylolpropane trimethacrylate, 2-isocyanoethyl methacrylate, N-methyl acrylamide, and glycidyl methacrylate or acrylate.

23. The process according to claim 1, wherein the first feed comprises monomers which constitute from 30 to 50 wt % of the total amount of monomers that are polymerised to form the heteropolymeric particles.

24. The process according to claim 1, wherein the non-ionisable hydrophilic monomer is included in the first and second feeds.

25. The process according to claim 1, wherein the ethylenically unsaturated monomers which are polymerised to form the heteropolymeric particles further include hydrophobic ethylenically unsaturated monomers, and said hydrophobic ethylenically unsaturated monomers are only included in the second feed.

26. The process according to claim 25, wherein the total amount of hydrophobic monomers polymerised constitute no more than 20 wt % of the total amount of monomers polymerised to form the heteropolymeric particles.

27. The process according to claim 26, wherein the total amount of hydrophobic monomers polymerised constitute no more than 10 wt % of the total amount of monomers polymerised to form the heteropolymeric particles.

28. The process according to claim 27, wherein the total amount of hydrophobic monomers polymerised constitute no more than 5 wt % of the total amount of monomers polymerised to form the heteropolymeric particles.

29. The process according to claim 25, wherein the hydrophobic ethylenically unsaturated monomers are selected from styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, vinyl butyrate, vinyl tert-butyrate, vinyl stearate and vinyl laurate.

30. The process according to claim 1, wherein the ethylenically unsaturated monomers further comprise polyfunctional monomers that are capable of introducing crosslinks into the polymeric structure of the heteropolymeric particles, and said polyfunctional monomers are only included in the second feed.

31. The process according to claim 30, wherein the polyfunctional monomers are selected from glycerol propoxy triacrylate, glycerol propoxy trimethacrylate, ethylene glycol dimethacrylate, trimethylolpropane triacrylate, trimethylolpropane trimethacrylate, 2-isocyanoethyl methacrylate, N-methyl acrylamide, and glycidyl methacrylate or acrylate.

32. The process according to claim 1, wherein the polymer composition formed through polymerisation of monomer provided in the first feed has a number average molecular weight of less than about 60,000.

33. The process according to claim 32, wherein the number average molecular weight is less than about 50,000.

34. The process according to claim 33, wherein the number average molecular weight is less than about 40,000.

35. The process according to claim 34, wherein the number average molecular weight is less than about 30,000.

36. The process according to claim 1, wherein the polymer composition formed through polymerisation of monomers provided in the first feed has a Tg of from about −50° C. to about 100° C.

37. The process according to claim 36, wherein the Tg is from about 10° C. to about 70° C.

38. The process according to claim 37, wherein the Tg is from about 10° C. to about 50° C.

39. The process according to claim 1, wherein the polymer composition formed through polymerisation of monomers provided in the second feed has a Tg of from about −50° C. to about 100° C.

40. The process according to claim 39, wherein the Tg is from about −10° C. to about 70° C.

41. The process according to claim 40, wherein the Tg is from about 0° C. to about 40° C.

42. The process according to claim 1, wherein the average particle size of the heteropolymeric particles formed is less than about 200 nm as measured by capillary hydrodynamic fractionation.

43. The process according to claim 1, wherein the aqueous dispersion is subsequently thickened by introducing an ionising agent to the dispersion.

44. A method of preparing a paint comprising combining conventional paint additives with the aqueous dispersion of water insoluble heteropolymeric particles prepared according to the process of claim 1.

45. The method according to claim 44, wherein the paint is thickened through the introduction of an ionising agent to the paint.

46. An aqueous dispersion of water insoluble heteropolymeric particles having a core/sheath structure, said heteropolymeric particles comprising polymerised ionisable ethylenically unsaturated monomers and polymerised non-ionisable hydrophilic ethylenically unsaturated monomers, wherein the polymerised ionisable ethylenically unsaturated monomers are present in an amount of less than 5 weight % throughout the polymeric composition of the heteroploymeric particles, wherein a segment which represents at least 30 weight % of the heteropolymeric particles has a polymeric composition which comprises no less than about 0.5 weight % and less than 5 weight % of polymerised ionisable ethylenically unsaturated monomers, based on the total weight of monomers polymerised to form the segment, wherein the core (a) is formed from at least 30 weight % of the total amount of monomers that are polymerised to form the heteropolymeric particles, and (b) comprises less than 20 weight % of the total amount of polymerised ionisable ethylenically unsaturated monomers, and wherein the combined amount of polymerised ionisable ethylenically unsaturated monomers and non-ionisable hydrophilic ethylenically unsaturated monomers constitute at least 75 weight % of the heteropolymeric particles.

47. A method of preparing a paint, adhesive, textile coating, carpet backing or construction material, the method comprising combining a paint, adhesive, textile coating, carpet backing or construction material additive, respectively, with an aqueous dispersion of heteropolymeric particles according to claim 46.

48. A method of preparing a paint, the method comprising combining a paint additive with an aqueous dispersion of heteropolymeric particles according to claim 46.

49. A paint, adhesive, textile coating, carpet backing or construction material comprising an aqueous dispersion of heteropolymeric particles according to claim 46.

50. A paint comprising an aqueous dispersion of heteropolymeric particles according to claim 46.

* * * * *